United States Patent
Dhanasekaran

(10) Patent No.: US 9,941,790 B2
(45) Date of Patent: Apr. 10, 2018

(54) DC-TO-DC CONVERTER

(71) Applicant: QUALCOMM Incorporated, San Diego, CA (US)

(72) Inventor: Vijayakumar Dhanasekaran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/830,415

(22) Filed: Aug. 19, 2015

(65) Prior Publication Data

US 2017/0054367 A1  Feb. 23, 2017

(51) Int. Cl.
*H02M 3/156* (2006.01)
*H02M 3/158* (2006.01)
*H02M 3/335* (2006.01)
*H02M 1/00* (2006.01)

(52) U.S. Cl.
CPC ........... *H02M 3/158* (2013.01); *H02M 3/156* (2013.01); *H02M 3/335* (2013.01); *H02M 3/33561* (2013.01); *H02M 2001/0003* (2013.01); *H02M 2001/009* (2013.01)

(58) Field of Classification Search
CPC ...... H02M 3/135; H02M 3/137; H02M 3/155; H02M 3/156; H02M 2001/0006; H02M 2003/155; H02M 2003/156; H02M 3/33561; H02M 2001/009; H02M 2001/0003
See application file for complete search history.

(56) References Cited

U.S. PATENT DOCUMENTS

| 5,389,839 | A | * | 2/1995 | Heck ...................... H03K 5/088 327/307 |
| 6,946,823 | B2 | | 9/2005 | Huang et al. |
| 9,007,039 | B2 | | 4/2015 | Kim et al. |
| 9,106,133 | B2 | | 8/2015 | Gilliom |

(Continued)

FOREIGN PATENT DOCUMENTS

KR           101009458 B1       1/2011

OTHER PUBLICATIONS

Woo Y.J., et al., "Load-Independent Control of Switching DC-DC Converters with Freewheeling Current Feedback," IEEE Journal of Solid-State Circuits, Dec. 2008, vol. 43 (12), pp. 2798-2808.

(Continued)

*Primary Examiner* — Matthew Nguyen
(74) *Attorney, Agent, or Firm* — Arent Fox, LLP and Qualcomm Incorporated

(57) ABSTRACT

A method and an apparatus for DC-to-DC conversion are provided. The apparatus is a DC-to-DC converter including a first feedback current control circuit coupled to a first voltage output of the DC-to-DC converter. The first feedback current control circuit is configured to generate a first control current based on a voltage difference between a first reference voltage and the first voltage output of the DC-to-DC converter. The apparatus further includes a constant charge comparator coupled to the first feedback current control circuit and configured to compare an integrated error signal to a threshold to generate a comparison result, the integrated error signal comprising an integration of a first error signal over time, the first error signal based on the first control current.

27 Claims, 6 Drawing Sheets

(56) References Cited

U.S. PATENT DOCUMENTS

| | | | |
|---|---|---|---|
| 2008/0231115 A1* | 9/2008 | Cho | H02J 1/08 |
| | | | 307/41 |
| 2009/0102445 A1* | 4/2009 | Ito | H02M 3/156 |
| | | | 323/283 |
| 2010/0026267 A1 | 2/2010 | Easwaran et al. | |
| 2011/0043181 A1 | 2/2011 | Jing et al. | |
| 2011/0115456 A1* | 5/2011 | Tanifuji | H02M 3/156 |
| | | | 323/283 |
| 2012/0286576 A1 | 11/2012 | Jing et al. | |
| 2012/0326691 A1 | 12/2012 | Kuan et al. | |
| 2013/0207631 A1* | 8/2013 | Hirakawa | H02M 3/156 |
| | | | 323/283 |
| 2014/0285014 A1 | 9/2014 | Calhoun et al. | |
| 2015/0256066 A1* | 9/2015 | Tanifuji | H02M 3/33592 |
| | | | 327/109 |

OTHER PUBLICATIONS

International Search Report and Written Opinion—PCT/US2016/042846—ISA/EPO—Nov. 7, 2016.

C.J. Solis, G.A. Rincon-Mora, "Nested Hysteretic Current-mode Single-inductor Multiple-output (SIMO) Boosting Buck Converter" NEWCAS 2013, 4 Pages.

Chien-Wei Kuan, Hung-Chih Lin, "Near-Independently Regulated 5-Output Single-Inductor DC-DC Buck Converter Delivering 1.2W/mm2 in 65nm CMOS" ISSCC 2012, 3 pages.

* cited by examiner

DC-TO-DC CONVERTER

BACKGROUND

Field

The present disclosure relates generally to direct current-to-direct current (DC-to-DC) converters, and more particularly, to a DC-to-DC converter having multiple voltage outputs.

Background

A DC-to-DC converter is an electronic circuit that converts a source of direct current (DC) from one voltage level to another. DC to DC converters may be used in a wide variety of electronic devices to convert one or more DC voltages to one or more other DC voltages. The voltage conversions provided may depend on the voltage needs of the particular electronic device. Some DC-to-DC converters may incorporate a switching regulator, which may provide for converting electrical power efficiently.

DC-to-DC converters may be particularly useful in portable electronic devices. Some example portable electronic devices include, but not limited to, mobile telephones, laptop computers, tablet computing devices, handheld computing devices, wearable computing devices, "smart phones," audio players, portable video players, portable game devices, cameras, and video cameras, to name a few examples.

SUMMARY

In an aspect of the disclosure, a method and an apparatus for DC-to-DC conversion are provided. The apparatus is a DC-to-DC converter including a first feedback current control circuit coupled to a first voltage output of the DC-to-DC converter. The first feedback current control circuit is configured to generate a first control current based on a voltage difference between a first reference voltage and the first voltage output of the DC-to-DC converter. The apparatus further includes a constant charge comparator coupled to the first feedback current control circuit and configured to compare an integrated error signal to a threshold to generate a comparison result, the integrated error signal comprising an integration of a first error signal over time, the first error signal based on the first control current.

In another aspect of the disclosure, DC-to-DC conversion is performed by generating a first control current based on a voltage difference between a first reference voltage and a first voltage output of a DC-to-DC converter. Further, DC-to-DC conversion is performed by comparing an integrated error signal to a threshold to generate a comparison result. The integrated error signal includes an integration of a first error signal over time. Additionally, the first error signal is based on the first control current.

DETAILED DESCRIPTION

Figure 1:
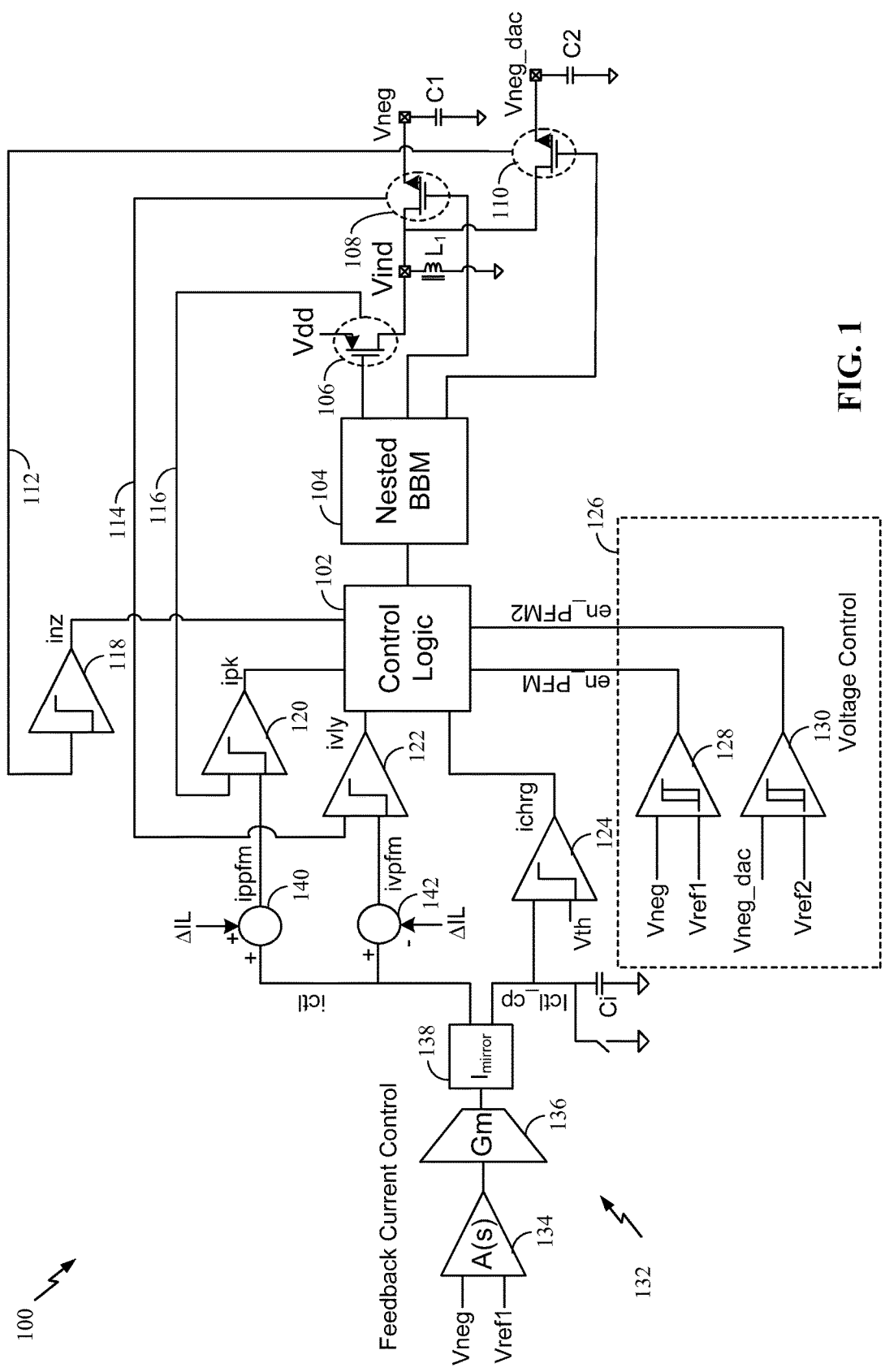
FIG. 1 is a block diagram illustrating an example DC-to-DC converter in accordance with this disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of DC-to-DC conversion will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer-executable code in the form of instructions or data structures that can be accessed by a computer.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some examples described herein relate to producing multiple voltage outputs using a single inductor in a DC-to-DC converter. In some examples, the proposed DC-to-DC converter may enable high cross-regulation between multiple outputs. Furthermore, some examples may provide for a single inductor multiple output (SIMO) DC-to-DC converter. A single inductor multiple output DC-to-DC converter may help achieve a lower component cost. The lower component cost may be because fewer inductors might be used in such a system. For example, a single inductor might be used for two or more output voltages. In some examples, the method and apparatus described herein may be used to provide a multiple output DC-to-DC converter when (a) some of the output voltages are supplying light load current and/or (b) the load currents for multiple supplies are not each present at the same time.

As described herein, some example DC-to-DC converters may switch an inductor current from one output to another using a "constant charge comparator." The constant charge comparator circuitry may be used to control a charge current such that a constant charge is supplied to each of one or more outputs of a DC-to-DC converter.

FIG. 1 is a block diagram illustrating an example DC-to-DC converter 100 in accordance with this disclosure. A controller, such as control logic 102 may implement various aspects of the instant application. The control logic 102 may be a processor system. Thus, as described above, the control logic 102 may include one or more processors, such as microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The one or more processors in the processing system may execute software, which, as described above, is construed broadly.

Furthermore, any gated logic or discrete hardware circuits may also be implemented using field programmable gate arrays (FPGAs), programmable logic devices (PLDs), gated logic, discrete hardware circuits, application-specific integrated circuits (ASICs) and other suitable hardware configured to perform the various functionality described throughout this disclosure. Accordingly, in one or more exemplary embodiments, the functions described may be implemented in hardware, software, firmware, or any combination thereof. If implemented in software, the functions may be stored on or encoded as one or more instructions or code on a computer-readable medium. The control logic 102 is discussed in more detail with respect to TABLE 1 below and throughout the specification.

The example illustrated in FIG. 1 includes nested break-before-make (BBM) circuitry 104. BBM circuitry breaks one connection of a plurality of connections before making another connection. The nested BBM circuitry 104 breaks all connections of three or more connections (only one of which should be active at a time) before making one new connection. Accordingly, the nested BBM circuitry 104 may be used to generally ensure that only one transistor of the transistors 106, 108, 110 is active at a time.

One example series of activations and deactivations of the transistors 106, 108, 110 is described below. It will be understood that other combinations of activations and deactivations of the transistors 106, 108, 110 may be used depending on the current needs of each voltage output, the specific implementation of the control logic 102, the specific implementation of the nested BBM circuitry 104, to name a few examples.

When the transistor 106 is on, a voltage, $V_{dd}$, is applied to $V_{ind}$ at an inductor $L_1$. (The voltage applied to $V_{ind}$ is decreased from $V_{dd}$ by any voltage drop across the transistor 106.) When the transistor 106 is active, both the transistors 108 and 110 are off due the functionality of the nested BBM circuitry 104. The inductor $L_1$ stores energy provided by $V_{dd}$. The energy stored in the inductor $L_1$ may then be provided to one of the outputs $V_{neg}$ or $V_{neg\_dac}$ through the transistors 108, 110 respectively depending on which of the transistor 108, 110 is turned on next.

In one example, after the nested BBM circuitry 104 causes the connection between $V_{dd}$ and $V_{ind}$ at the inductor $L_1$ to be broken by turning the transistor 106 off, the nested BBM circuitry 104 may then turn on one of the transistors 108, 110. Assuming, in one example, the transistor 108 is the first transistor turned on after turning off the transistor 106, energy stored in the inductor $L_1$ may then be provided to the voltage output $V_{neg}$. By turning on the transistor 108, energy stored in inductor $L_1$ that was provided by the voltage $V_{dd}$ may then be stored at the capacitor $C_1$. Depending on the load on the voltage output $V_{neg}$, the capacitor $C_1$ may be charged. The capacitor $C_1$ may be charged when the load current on the voltage output $V_{neg}$ is less than the inductor current through the inductor $L_1$. If the current used at the voltage output $V_{neg}$ is greater than the inductor current through the inductor $L_1$, however, then the capacitor $C_1$ will not charge. Rather the current being used at the voltage output $V_{neg}$ may be provided by a combination of current from the capacitor $C_1$ and the current from inductor $L_1$. Generally, however, the inductor current will the greater than the current being used by the load on the voltage output $V_{neg}$. Accordingly, the capacitor $C_1$ will be charged by the current from the inductor $L_1$, or the capacitor $C_1$ will be charged by at least some percentage of the current from the inductor $L_1$. Some of the current from the inductor $L_1$ may be provided to a load on the voltage output $V_{neg}$. In other words, if a load is on the voltage output $V_{neg}$ then not all of the current from inductor $L_1$ is available to charge the capacitor $C_1$.

At some point, the nested BBM circuitry 104 will turn the transistor 108 off. If more energy needs to be stored in the inductor $L_1$, the transistor 106 may be turned back on so that $V_{dd}$ may supply more energy to the inductor $L_1$. If the nested BBM circuitry 104 turned the transistor 106 back on then, the nested BBM circuitry 104 may turn off the transistor 106 after additional energy is stored in the inductor $L_1$.

Nested BBM circuitry 104 may turn on the transistor 110 to supply charge to the voltage output $V_{neg\_dac}$. When the transistor 110 is on, energy stored in the inductor $L_1$ may then be provided to the voltage output $V_{neg\_dac}$. Depending on the load on the voltage output $V_{neg\_dac}$, the capacitor $C_2$ may then be charged. In the illustrated example of FIG. 1, it is assumed that the output $V_{neg}$ generally uses more current than the output $V_{neg\_dac}$. Accordingly, inductor current from the inductor $L_1$ will generally be greater than the current being supplied to any load on the output $V_{neg\_dac}$. Accordingly, the inductor current from the inductor $L_1$ will generally charge the capacitor $C_2$ when the transistor 110 is on, assuming the inductor $L_1$ has been provided with some amount of energy from $V_{dd}$ through the transistor 106. As described herein the inductor current provided to the output $V_{neg\_dac}$ may vary. The circuitry described in FIG. 1, however, may generally provide a constant charge to the output $V_{neg\_dac}$. When the transistor 110 is on, some percentage of the inductor current from inductor $L_1$ may charge the capacitor $C_2$ and some percentage of the inductor current from the inductor $L_1$ may be provided to any load that happens to be on the output $V_{neg\_dac}$.

The connections 112, 114, 116 may be used to provide feedback of the current through their respective transistors, transistor 110, transistor 108, or transistor 106. For example, the transistor 110 may be coupled to the comparator 118 through connection 112. In some examples, the comparator 118 may compare a reference current to a current flowing into the transistor 110. The voltage across the transistor 110 may be proportional to current flowing into transistor 110. Accordingly, the current flowing into the transistor 110 may be sensed by using the connection 112 to measure the voltage across transistor 110. The current sensed using the connection 112, e.g., by measure the voltage across transistor 110, may generally be proportional to the current flowing through the output $V_{neg\_dac}$. The current sensed using the connection 112 may be a small percentage of the current flowing through the output $V_{neg\_dac}$. For example, the current flowing on the connection 112 may be $1/10,000$ of the current flowing through output $V_{neg}$. The comparator 118 may be used to determine some attribute of the current flowing through the output $V_{neg\_dac}$ because the current flowing on the connection 112 is proportional to the current flowing through the output $V_{neg\_dac}$. As illustrated in FIG. 1 the comparator 118 may be configured to indicate a zero crossing for the current on $V_{neg\_dac}$. As the current output from a voltage source such as the voltage output at $V_{neg\_dac}$ generally is never negative the zero crossing may generally be a dip to zero or near zero current rather than an actual crossing. The transistor 108 may be coupled to the comparator 122 through connection 114. The comparator 122 may be used to determine some attribute of the current flowing through the output $V_{neg}$. As illustrated in FIG. 1, the comparator 122 may be used to determine a current valley, e.g., a period of time when the current is low relative to the current immediately prior to that time and immediately following that time. The current sensed using the connection 114 may be a percentage of the current through the transistor 108. Generally the current on the connection 114 will be a very low percentage of the current through the transistor 108. For example, the current on the connection 114 may be $1/10,000$ of the current through the transistor 108.

A charge comparator 124 may be used to determine when the output $V_{neg\_dac}$ has received a fixed amount of charge during a current charging cycle. The charge comparator 124 will generally indicate when the fixed amount of charge has been provided to the output $V_{neg\_dac}$ as will be described in greater detail below.

As illustrated in FIG. 1, voltage control 126 may also be used to control the flow of charge current to the outputs of DC-to-DC converter 100. Some examples may continue to apply the charging current to the first output of the DC-to-DC converter based on the comparison between the voltage at the first voltage output and the first reference voltage and a comparison between the voltage at a second voltage output and a second reference voltage. For example, the voltage control 126 includes circuitry that may perform these comparisons. The comparator 128 compares $V_{neg}$ and $V_{ref1}$, and the comparator 130 compares $V_{neg\_dac}$ and $V_{ref2}$. The outputs of the comparator 128 and the comparator 130 may be inputs to the control logic. Accordingly, the flow of charge current to the outputs of the DC-to-DC converter 100 may be controlled based on inputs en_PFM, en_PFM2, or both (as well as other inputs to the control logic 102). Switching between the outputs may occur based on the inputs to the control logic 102, including inputs en_PFM, en_PFM2.

Additionally, in the illustrated example of FIG. 1, comparator 128 compares the voltage on voltage output $V_{neg}$ to a reference voltage $V_{ref1}$. The output of comparator 128 is an enable signal for pulse frequency modulation control the charging current provided to the output $V_{neg}$. In the illustrated example of FIG. 1 amplifier 134 amplifies any difference between the voltage on voltage output $V_{neg\_dac}$ and a reference voltage $V_{ref2}$. The output of amplifier 134 is an enable signal for pulse frequency modulation control of the charging current provided to the output $V_{neg\_dac}$.

The charge comparator 124 may be referred to as a constant charge comparator. The constant charge comparator may operate on an error amplifier (EA) output, such as an output of amplifier 134. The amplifier 134 may be referred to as a difference amplifier or an error amplifier because the amplifier 134 amplifies a difference (error) between an output voltage, here $V_{neg}$, and a reference voltage, here $V_{ref1}$. In the illustrated example of FIG. 1, the constant charge comparator (e.g., charge comparator 124) may operate on some representation of an EA output, e.g., the output of a current mirror 138, which generally follows the current from voltage-to-current converter 136 (e.g., transconductor Gm). The error amplifier output may approximate a signal proportional to a supply current, such as the inductor current used to supply current to each output. For example, the signal proportional to the supply current may be an electrical current approximately $1/10,000$ of the supply current. It will be understood, however, that any other fraction of the supply current may be used. The signal proportional to the supply current may be used as a control current ($i_{ctrl}/i_{ctrl\_cp}$). Additionally, the control current may be integrated on a capacitor, $C_i$. The charge comparator 124 may indicate when the voltage at the capacitor reaches a pre-determined threshold voltage $V_{th}$.

In some examples, the threshold may be a fixed voltage or the threshold may be adapted based on load current at the given output via another error amplifier/voltage-to-current converter stage (as discussed with respect to FIG. 3, below). In some examples, there may be no need to adapt $V_{th}$. For example, if the load is near constant bias currents $V_{th}$ might not need to be adapted based on load current. In some examples, the constant charge switching method may allow for the same amount of charge to be injected at one output regardless of current injected on another output. This may eliminate the need for low offset high-speed comparator. Additionally, some examples may ensure good cross regulation with ripple at a second output being virtually independent of loading at a first output.

As discussed above, in the illustrated example of FIG. 1, comparator 128 compares the voltage on voltage output $V_{neg}$ to a reference voltage $V_{ref1}$. When the current on the output $V_{neg}$ is generally higher than the current on output $V_{neg\_dac}$, the current on the output $V_{neg}$ will generally be what controls the inductor current. Because the current on the output $V_{neg}$ will generally be what controls the inductor current, $V_{neg}$ is what is monitored by amplifier 134 in the example of FIG. 1 to estimate the inductor current. The control current may be generated by amplifier 134 and voltage-to-current converter 136 (e.g., transconductor Gm). It will be understood, however that, while amplifier 134 amplifies the difference between a reference voltage, $V_{ref1}$, and output voltage, $V_{neg}$, other output voltages, such as the output voltage $V_{neg\_dac}$ may be an input to the same or similar feedback current control circuitry to feedback current control circuit 132 depending on which output provides a larger amount of current. Thus, in another example, the voltage $V_{neg\_dac}$ may be compared to the voltage $V_{ref1}$ and the difference may be amplified by amplifier 134 instead of the voltage $V_{neg}$. In other words, in other examples the voltage $V_{neg\_dac}$ may be substituted for the voltage $V_{neg}$ in the feedback current control circuit 132. This might be done if the inductor current from inductor $L_1$ is generally controlled by the current needs of the output $V_{neg\_dac}$. The inductor current through inductor $L_1$ might generally be controlled by the current needs of the output voltage $V_{neg\_dac}$ when the current used by the output $V_{neg\_dac}$ is generally higher than the current used by output $V_{neg}$ or the average current needs of the output voltage $V_{neg\_dac}$ are generally higher than the average current needs of the output voltage $V_{neg}$, such as when the current needs of the output voltage $V_{neg}$ are generally low but high spikes in current occur from time to time, while the average current needs of output voltage $V_{neg\_dac}$ are higher.

The voltage-to-current converter 136 outputs a first control current of a plurality of control currents based on the first control current. The current based on voltage-to-current converter 136 may be replicated using the current mirror 138. The control current may be an input of adding circuitry 140, 142. The adding circuitry 140, 142 may be used to add some hysteresis to the control current for the generation of ippfm (adding circuitry 140) and ivpfm (adding circuitry 142). The signal ippfm may be compared to the current from connection 116 to generate the peak signal, $i_{pk}$. The signal ivpfm may be compared to the current from connection 114 to generate the valley signal, $i_{vly}$.

Another output of current mirror 138 may be output to an integrator circuit. As illustrated in FIG. 1, the capacitor $C_i$ may be used as an integrator circuit. The capacitor $C_i$ may integrate the control current to generate the integrated error signal. The integrated error signal may be used to decide when to stop charging one of the outputs, $V_{neg}$, $V_{neg\_dac}$, of the DC-to-DC converter 100 based on a comparison with a threshold $V_{th}$ using charge comparator 124.

Figure 2:
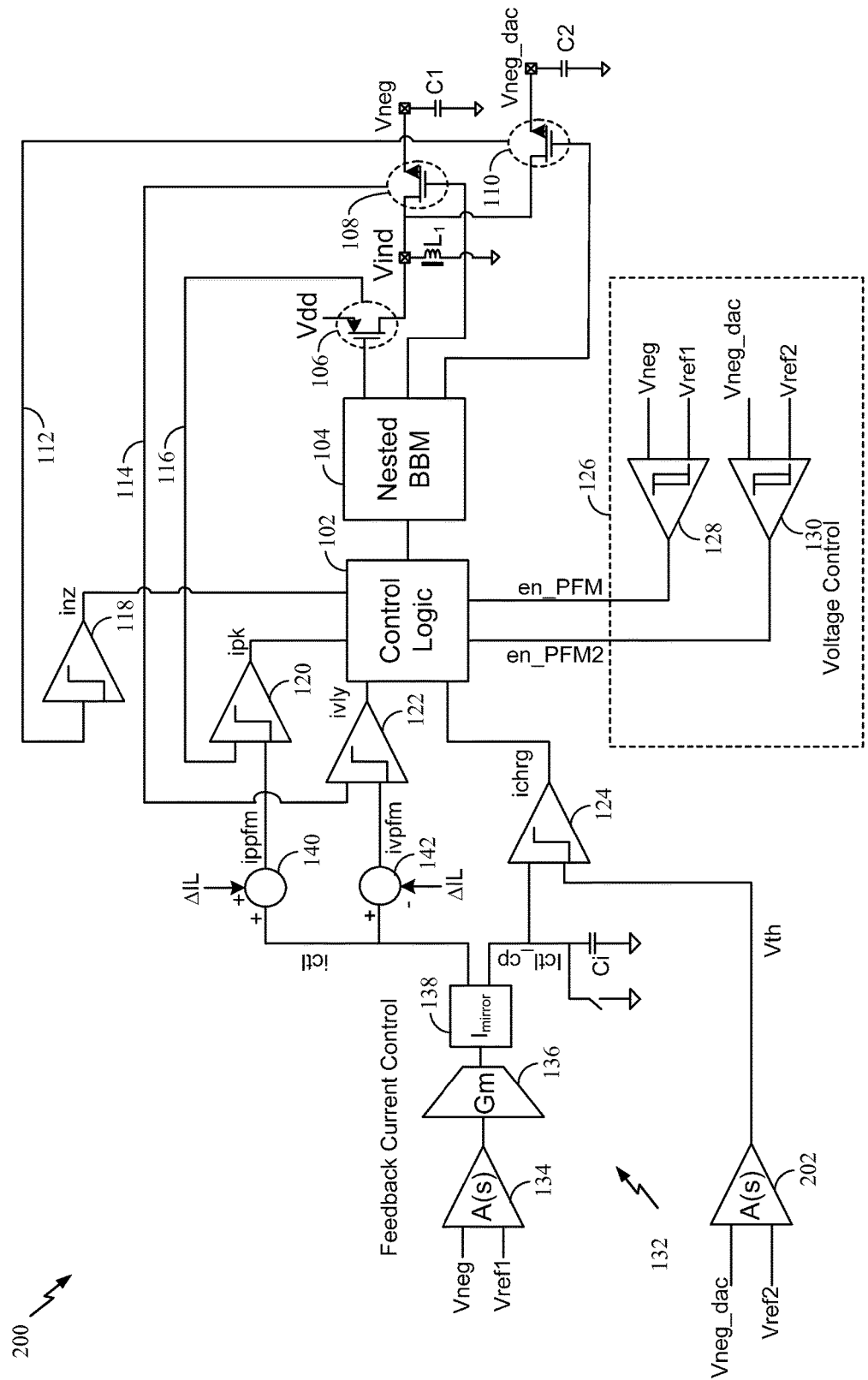
FIG. 2 is a block diagram illustrating an example DC-to-DC converter in accordance with this disclosure.

FIG. 2 is a block diagram illustrating an example DC-to-DC converter 200 in accordance with this disclosure. The DC-to-DC converters 200 may vary the threshold used to determine when to switch from charging $V_{neg\_dac}$. By varying the threshold used to determine when to switch from charging $V_{neg\_dac}$ based on the difference between the voltage at $V_{neg\_dac}$ and $V_{ref2}$, longer charging periods may be used when the voltage at $V_{neg\_dac}$ is lower. Having a longer charging period when the absolute value of the voltage at $V_{neg\_dac}$ is lower may more quickly bring the lower voltage at $V_{neg\_dac}$ up to the correct voltage level by more quickly charging the capacitor $C_2$. Note that, generally, only differences between $V_{neg\_dac}$ and $V_{ref2}$ where the absolute value of $V_{neg\_dac}$ is lower than $V_{ref2}$ are considered. Additional charge current will generally be unnecessary when the absolute value of $V_{neg\_dac}$ is higher than $V_{ref2}$ as such a condition would generally be worsened by sending extra current to the voltage output $V_{neg\_dac}$ because sending extra current would generally charge the capacitor $C_2$ more and increase a voltage that may be already high to begin with.

Because the threshold may be varied in the example of FIG. 2, the example of FIG. 2 does not strictly use constant charge, but may vary based on differences between $V_{neg\_dac}$ and $V_{ref2}$. A constant charge may be used, however, for either a given difference between $V_{neg\_dac}$ and $V_{ref2}$ or for cases when the voltage $V_{neg\_dac}$ is higher than the voltage $V_{ref2}$. Accordingly, if an example system generally operates at a voltage higher than $V_{ref2}$, the system will use constant charge. The difference between $V_{neg\_dac}$ and $V_{ref2}$ will generally only change the amount of charge used to charge the $V_{neg\_dac}$ output when the voltage is lower than $V_{ref2}$ because charging $V_{neg\_dac}$ when it is above $V_{ref2}$ will only increase the voltage further above $V_{ref2}$.

Figure 3:
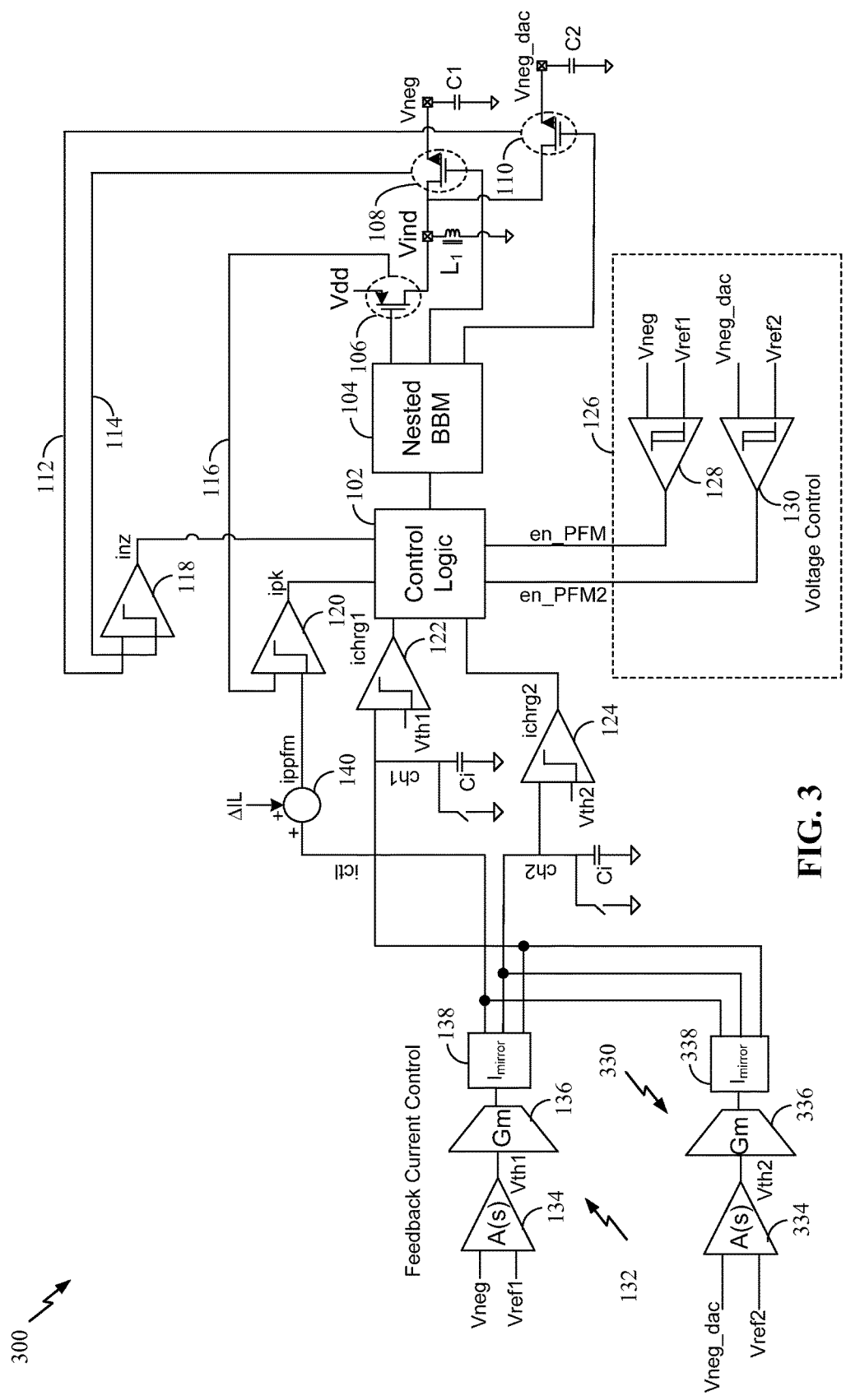
FIG. 3 is a block diagram illustrating an example DC-to-DC converter in accordance with this disclosure.

FIG. 3 is a block diagram illustrating an example DC-to-DC converter 300 in accordance with this disclosure. As illustrated in FIG. 3, two (or more) feedback current control circuits 132, 330 may be used, for example, when it is unknown which of two (or more) output currents will be greater. FIG. 3 is generally similar to FIGS. 1 and 2 but includes two feedback current control circuits 132, 330.

Accordingly, circuitry in the DC-to-DC converter 300 may generate a second control current based on a voltage difference between a second reference voltage and a second voltage output of the DC-to-DC converter. Thus, as in FIGS. 1 and 2, the amplifier 134 may determine a first voltage difference between the first voltage output and the first reference voltage. Similarly, the amplifier 334 may determine a second voltage difference between the second voltage output and the second reference voltage. The two voltage differences may be used to generate two control currents.

The amplifier 134 may amplify the first voltage difference between the first voltage output and the first reference voltage to output the first control current. As described above, the amplifier 134 may be referred to as a difference amplifier or an error amplifier because the amplifier 134 amplifies a difference (error) between an output voltage, here $V_{neg}$, and a reference voltage, here $V_{ref1}$. The amplifier 334 may amplify the second voltage difference between the second voltage output and the second reference voltage to output the second control current. The amplifier 334 may also be referred to as a difference amplifier or an error amplifier because the amplifier 334 also amplifies a difference (error) between an output voltage, here $V_{neg\_dac}$, and a reference voltage, here $V_{ref2}$. Thus, the second control current may be based on the amplified difference between the voltage at output $V_{neg\_dac}$, and the voltage $V_{ref1}$ using amplifier 334. This amplified difference may be converted into a current at voltage to current converter 336. Generally this current may be a small percentage of the inductor current at inductor $L_1$. For example, the current may be $\frac{1}{10{,}000}$ of the inductor current. Generally the same percentage may be used for feedback current control circuit 132 and feedback current control circuit 330.

The voltage-to-current converter 136 outputs a first control current of a plurality of control currents based on the first control current. The current based on voltage-to-current converter 136 may be replicated using the current mirror 138. Similarly, the voltage-to-current converter 336 outputs a second plurality of control currents based on the second control current. A current mirror 338 may replicate the second current of the plurality of control currents based on the second control current. Each of these control currents may be added together such that the sum of the first control current and the second control current comprise a combined control current. The combined currents may be one input of adding circuitry 140. The adding circuitry 140 may be used to add some hysteresis to the control current for the generation of ippfm to be compared to the current from connection 116 to generate the peak signal, $i_{pk}$. Furthermore, as illustrated in FIG. 3, multiple replicated versions of the combined control current may be generated using the current mirror 138 and the current mirror 338.

In the example of FIG. 3, the generation of the valley signal (e.g., $i_{vly}$, FIG. 1) may be replaced by a comparison between a first threshold $V_{th1}$ and the combined two currents using the comparator 122. A comparison between a first threshold $V_{th1}$ and the combined two currents indicates when the combined current goes above a threshold.

The capacitor $C_i$ may be used as an integrator circuit. For example, the capacitor $C_i$ may integrate the combined control current to generate the integrated error signal. The integrated error signal may be used to decide when to stop charging one of the outputs, $V_{neg}$, $V_{neg\_dac}$, of the DC-to-DC converter 300 based on a comparison with a threshold $V_{th2}$ using charge comparator 124.

Figure 4:
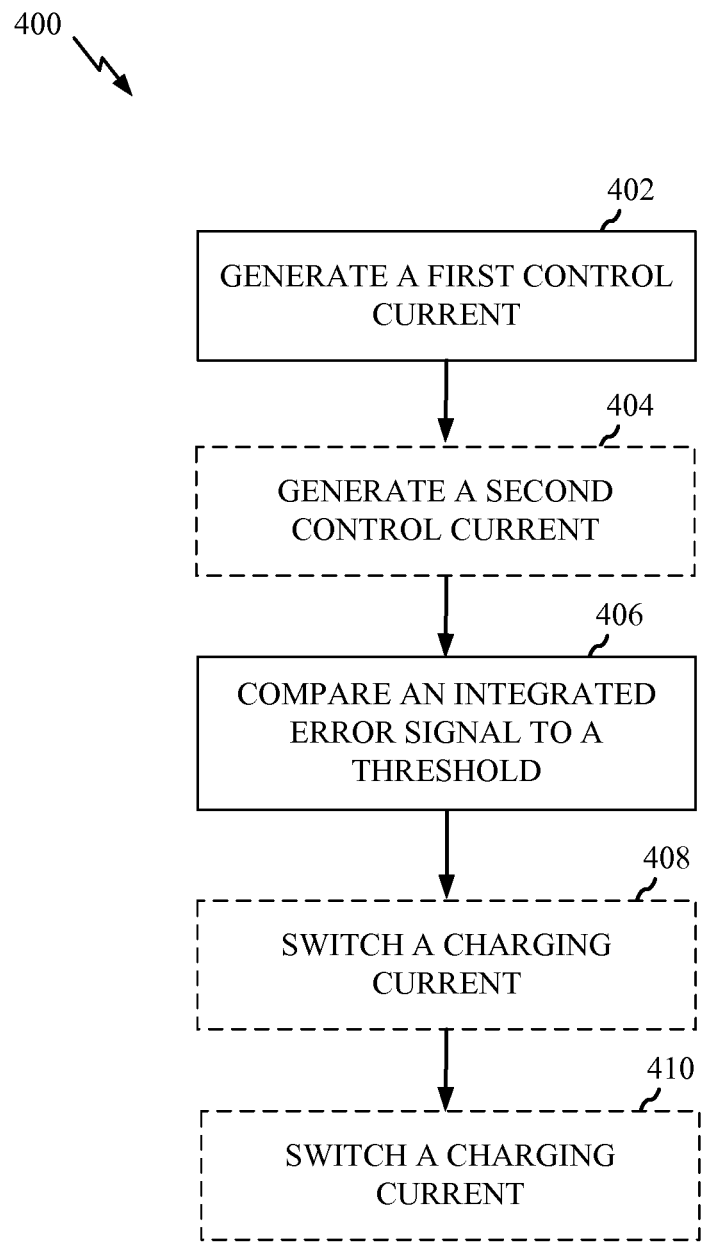
FIG. 4 is a flowchart of a method of DC-to-DC conversion in accordance with this disclosure.

FIG. 4 is a flowchart 400 of a method of DC-to-DC conversion in accordance with this disclosure. The method may be performed by a DC-to-DC converter, such as DC-to-DC converter 100 of FIG. 1, DC-to-DC converter 200 of FIG. 2 or DC-to-DC converter 300 of FIG. 3. It will be understood that FIGS. 1-3 are example DC-to-DC converters 100, 200, 300 and other DC-to-DC converters may implement the systems and methods described herein.

At block 402, circuitry in the DC-to-DC converter 100, 200, 300 generates a first control current based on a voltage difference between a first reference voltage and a first voltage output of the DC-to-DC converter. For example, the control current may be based an amplified difference between the voltage, $V_{neg}$, and the voltage $V_{ref1}$ at the amplifier 134. This amplified difference may be converted into a current at voltage to the current converter 136 (e.g., transconductor Gm). Generally this current may be a small percentage of the inductor current at the inductor $L_1$. For example, the first control current may be $\frac{1}{10,000}$ of the inductor current at the inductor $L_1$.

As described herein, the voltage, $V_{neg}$, may be used in some examples, such as the example of FIG. 1, to determine how long to charge the $V_{neg\_dac}$ output. In other words, in some examples, monitoring one voltage is used to control the current charge used to charge another voltage output. The voltage, $V_{neg}$, may be used to determine how long to charge the $V_{neg\_dac}$ output in cases when the voltage, $V_{neg}$, may be a better indicator of the inductor current on inductor $L_1$. The voltage, $V_{neg}$, may be a better indicator of the inductor current on inductor $L_1$ when $V_{neg}$ uses more current than $V_{neg\_dac}$, and $V_{neg\_dac}$ is only active for short periods of time. When $V_{neg\_dac}$ is only active for a short period of time, while the charge current to $V_{neg}$ may generally be active for a longer period of time the current used to charge $V_{neg}$ may be a better indicator of the inductor current through $L_1$. The charging current to $V_{neg}$ generally controls the inductor current on inductor $L_1$ because the current through an inductor cannot be instantaneously changed and the current to $V_{neg}$ output may be applied much longer than current is applied to $V_{neg\_dac}$ (in some examples).

One aspect of the instant application is that as inductor current through the $L_1$ changes due to the changing needs of the $V_{neg}$ output an example system may still supply a generally constant power to the $V_{neg\_dac}$ output, i.e., the current over time will generally remain constant. As more current is used by a load on the output $V_{neg}$, the $V_{neg}$ output will be supplied with more current from the inductor $L_1$. When the inductor current from the $L_1$ is switched to the output $V_{neg\_dac}$, the voltage on the capacitor $C_1$ ($V_{neg}$) will decrease as current is supplied from the $C_1$ to the load on the $V_{neg}$ output. As the difference between the voltage $V_{neg}$ and the voltage $V_{ref1}$ increases the current output of voltage to the voltage-to-current converter 136 (e.g., transconductor Gm) and the current mirror 138 will increase. Accordingly, the voltage on capacitor Ci, which may be charged by one of the currents from the current mirror 138, will increase more rapidly when the inductor current from the inductor $L_1$ is higher. The total charge (current integrated over time) supplied to the output $V_{neg\_dac}$, however, will generally be constant for all of the charging cycles. The higher inductor current at the inductor $L_1$, the lower the charging time at $V_{neg\_dac}$. Furthermore, changes in inductor current and charging times should change proportionally to each other and thus, the total charge supplied to the output $V_{neg\_dac}$ will generally be constant.

As described herein, other example, the DC-to-DC converters 200 (FIG. 2) may vary the threshold used to determine when to switch from charging $V_{neg\_dac}$. By varying the threshold used to determine when to switch from charging $V_{neg\_dac}$ based on the difference between the voltage at $V_{neg\_dac}$ and $V_{ref2}$, longer charging periods may be used when the voltage at $V_{neg\_dac}$ is lower. Accordingly, the example of FIG. 2 does not strictly use constant charge, but may vary based on differences between $V_{neg\_dac}$ and $V_{ref2}$. A constant charge may be used, however, for either a given difference between $V_{neg\_dac}$ and $V_{ref2}$ or for cases when the voltage $V_{neg\_dac}$ is higher than the voltage $V_{ref2}$. Accordingly, if an example system generally operates at a voltage higher than Vref, the system will use constant charge. The difference between $V_{neg\_dac}$ and $V_{ref2}$ will generally only change the amount of charge used to charge the $V_{neg\_dac}$ output when the voltage is lower than $V_{ref2}$ because charging $V_{neg\_dac}$ when it is above $V_{ref2}$ will only increase the voltage further above $V_{ref2}$.

Optionally, at block 404, circuitry in the DC-to-DC converter 300 may generate a second control current based on a voltage difference between a second reference voltage and a second voltage output of the DC-to-DC converter. For example, the control current may be based on an amplified difference between the voltage at output $V_{neg\_dac}$, and the voltage $V_{ref1}$ using the amplifier 334 (FIG. 3). This amplified difference may be converted into a current at voltage to the current converter 336. Generally this current may be a small percentage of the inductor current at the inductor $L_1$. For example, the current may be $\frac{1}{10,000}$ of the inductor current. Generally the same percentage may be used for the feedback current control circuit 132 and the feedback current control circuit 330.

Block 404 may be performed in some examples when the outputs $V_{neg}$ and $V_{neg\_dac}$ are not active at the same time, but the current used by the outputs $V_{neg}$ and $V_{neg\_dac}$ may be similar. Block 404 may also be performed when it is unknown which output $V_{neg}$ or $V_{neg\_dac}$ will use more current. In the examples described above, two sets of feedback current control circuit 132, 330 may be used. The current output of the two sets of feedback current control circuit 132, 330 may be added together and integrated over time by capacitor $C_i$. For the case when the outputs $V_{neg}$ and $V_{neg\_dac}$ are not active at the same time, but the current used by outputs $V_{neg}$ and $V_{neg\_dac}$ may be similar, adding the current outputs of the two sets of feedback current control circuitry together and integrating the current over time using capacitor $C_i$, may lead to a better estimate of the inductor current on inductor $L_1$. Similarly, for the case when it may be unknown which output $V_{neg}$ or $V_{neg\_dac}$ will use more current, adding the current outputs of the two sets of feedback current control circuitry together and integrating the current over time using capacitor $C_i$, may lead to a better estimate of the inductor current on inductor $L_1$. Accordingly, adding the two charges together and integrating on $C_i$ may perform better for sending a fixed amount of charge over a series of charging cycles to one or more of the outputs, $V_{neg}$, $V_{neg\_dac}$, or both. For example, the "fixed amount of charge" may be a more consistent amount of charge by using the combination of the two currents. (It will be understood that, while one aspect of this disclosure may relate to using a fixed charge to supply power to one or more outputs of the DC-to-DC converter 100, 200, 300, the actual amount of charge may vary based on a number of factors, such as variations in temperature, variation in components, changes in components over time, changes in supply voltage, as well as any other factors that may impact the functioning of the circuitry used to implement the systems and methods described herein.

At block 406, circuitry in the DC-to-DC converter 100, 200, 300 compares an integrated error signal to a threshold to generate a comparison result, ichrg. The integrated error signal, ichrg_cp, may be an integration of a first error signal over time. The first error signal may be a current that is based on the first control current, e.g., one of the outputs of current mirror 138, which mirrors the current output of voltage to current converter 136 (e.g., transconductor Gm). As described above, the current being integrated by capacitor $C_i$ is generally a percentage of the current through inductor $L_1$. For some examples, the current through inductor $L_1$ may be estimated by comparing the voltage at output $V_{neg}$ to a voltage reference $V_{ref1}$. For other examples, the current through the inductor $L_1$ may be estimated by performing two comparisons, steps 402, 404, comparing the voltage at output $V_{neg}$ to a voltage reference $V_{ref1}$ (402) and the voltage at output $V_{neg\_dac}$ to a voltage reference $V_{ref2}$ (404).

At block 408, circuitry in the DC-to-DC converter 100, 200, 300 switches a charging current to the first voltage output of the DC-to-DC converter based on a comparison between a voltage at the first voltage output and the first reference voltage. For example, the control logic 102 may control the nested BBM circuitry 104 and cause the transistor 110 to become active to supply inductor current from the inductor $L_1$ to the output $V_{neg\_dac}$. The nested BBM circuitry 104 will only activate one of the transistor 106, 108, 110 at a time.

Additionally, some examples may continue to apply the charging current to the first output of the DC-to-DC converter based on the comparison between the voltage at the first voltage output and the first reference voltage and a comparison between the voltage at a second voltage output and a second reference voltage. For example, the voltage control 126 includes circuitry that may perform these comparisons. The comparator 128 compares $V_{neg}$ and $V_{ref1}$, and the comparator 130 compares $V_{neg\_dac}$ and $V_{ref2}$.

At block 410, circuitry in the DC-to-DC converter 100, 200, 300 switches the charging current to the second voltage output of the DC-to-DC converter based on the comparison of the voltage at the second voltage output of the DC-to-DC converter and the second reference voltage. Switching the charging current to the second voltage output of the DC-to-DC converter may be further based on an occurrence of a valley in the voltage at the second voltage output of the DC-to-DC converter. Additionally, some examples may continue to apply the charging current to the second voltage output of the DC-to-DC converter based on the comparison result of the integrated error signal. For example, as described above, the voltage, $V_{neg}$, may be used in some examples, such as the example of FIG. 1, to determine how long to charge the $V_{neg\_dac}$ output because the voltage, $V_{neg}$, may be a better indicator of the inductor current on inductor $L_1$ where the charge current to $V_{neg\_dac}$ is generally only active for a short period of time, while the charge current to $V_{neg}$ may generally be active for a longer period of time.

Figure 5:
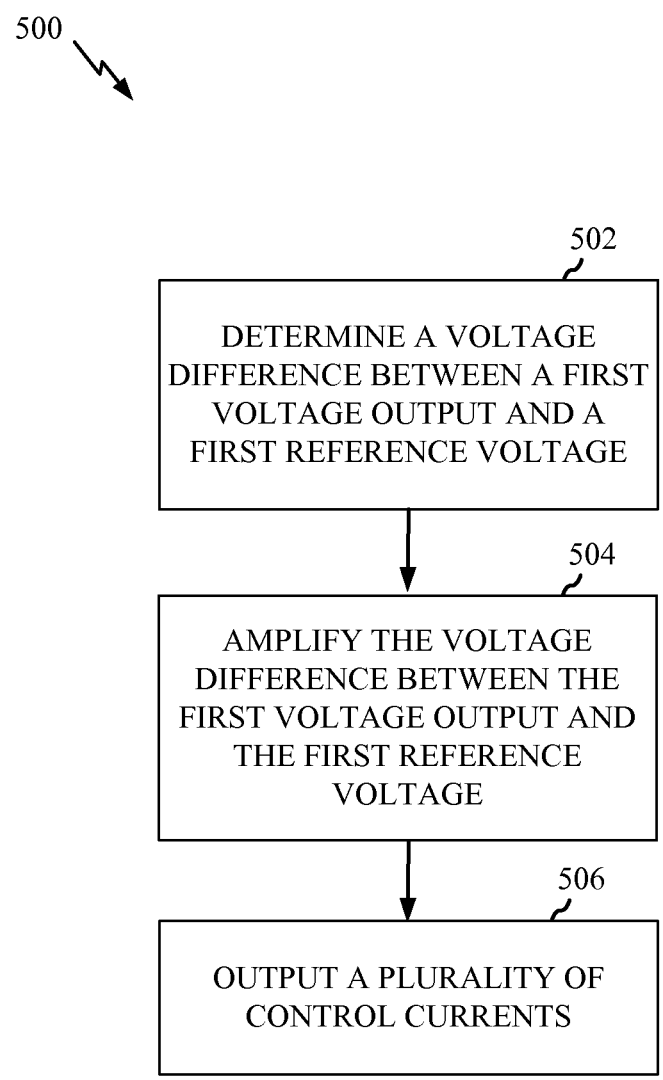
FIG. 5 is a flowchart of a method related to feedback current control of a DC-to-DC conversion in accordance with this disclosure.

FIG. 5 is a flowchart 500 of a method related to feedback current control of a DC-to-DC conversion in accordance with this disclosure. The method illustrated in FIG. 5 is an example way to determine a first error signal that may then be integrated to estimate an amount of charge sent to a particular output of the DC-to-DC converter 100, 200. The DC-to-DC converter 300 generally uses a similar method but includes multiple error signals. An example method related to feedback current control of the DC-to-DC converter 300 of FIG. 3 is discussed with respect to FIG. 6.

At block 502, the amplifier 134 determines the voltage difference between a first voltage output and a first reference voltage. For example, the amplifier 134 determines the voltage difference between $V_{neg}$ and $V_{ref1}$. The voltage difference between the first voltage output, e.g., $V_{neg}$, and the first reference voltage, $V_{neg\_dac}$ may be used to estimate the current through inductor $L_1$. As described above, $V_{neg}$, may be a better indicator of the inductor current on inductor $L_1$ because, in some examples using the DC-to-DC converter of FIG. 1, the charge current to $V_{neg\_dac}$ is only active for a short period of time, while the charge current to $V_{neg}$ may generally be active for a longer period of time. Accordingly, the charging current to $V_{neg}$ generally controls the inductor current on inductor $L_1$ because the current through an inductor cannot be instantaneously changed. At block 504, the amplifier 134 amplifies the voltage difference between the first voltage output and the first reference voltage to output the first control current. For example, the amplifier 134 amplifies the voltage difference between $V_{neg}$ and $V_{ref1}$. The amplified difference between $V_{neg}$ and $V_{ref1}$ may be used to generate the control signal, e.g., the first control current. Voltage to the current converter 136 (e.g., transconductor Gm) may output the first control current.

At block 506, the current mirror 138 may output a plurality of control currents based on the first control current. At least one of the plurality of control currents is the error signal that is integrated. The first control current or any one of the plurality of control currents based on the first control current are generally related to the inductor current through inductor $L_1$. The control current is generally a percentage of the inductor current through inductor $L_1$, e.g., $1/10,000$. Accordingly, by integrating the first control current or any one of the plurality of control currents based on the first control current, an estimate of the amount of charge flowing to an output of the DC-to-DC converter 100, e.g., output $V_{neg\_dac}$, may be determined. The estimate of the amount of charge flowing to the output of the DC-to-DC converter, e.g., $V_{neg\_dac}$, may be used to control switching of the inductor current through inductor $L_1$ to and from the output of the DC-to-DC converter, e.g., $V_{neg\_dac}$.

Figure 6:
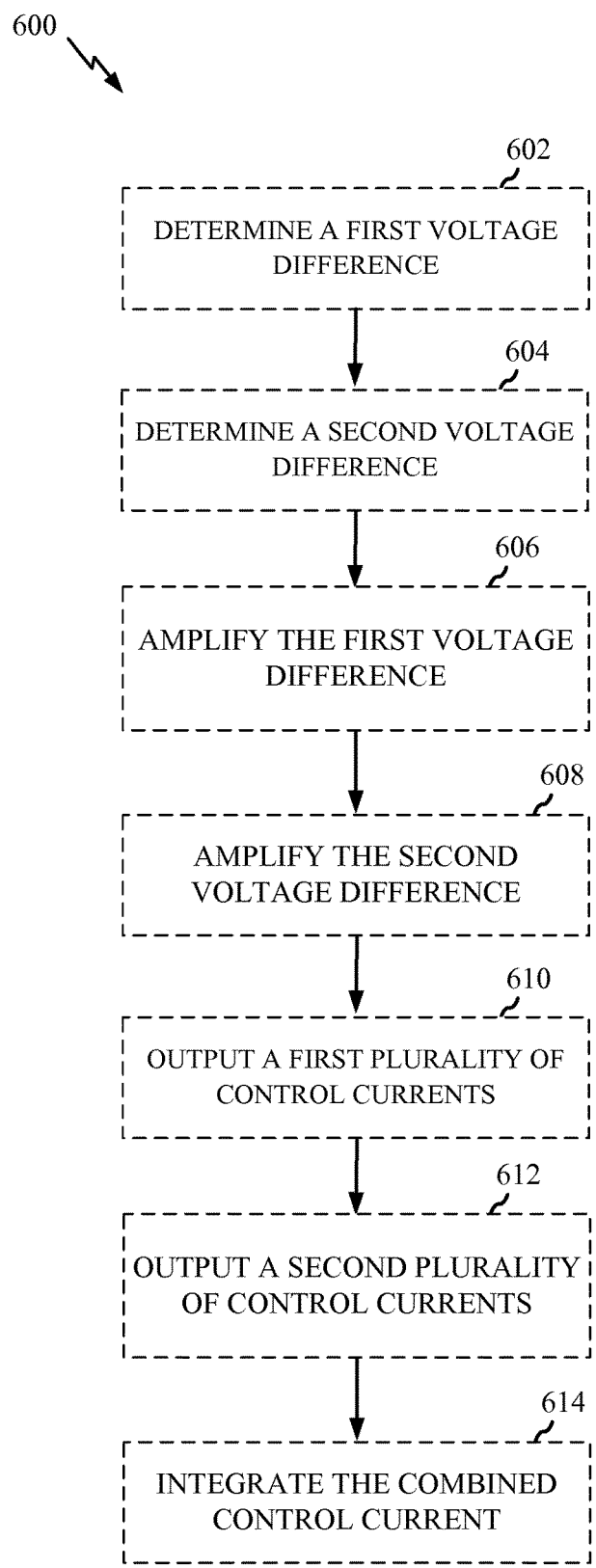
FIG. 6 is another flowchart of a method related to feedback current control of a DC-to-DC conversion in accordance with this disclosure.

FIG. 6 is another flowchart 600 of a method related to feedback current control of a DC-to-DC conversion in accordance with this disclosure. Two feedback current control circuits 132, 330 circuits may be used, for example, when it is unknown which of two (or more) output currents will be greater. The method of FIG. 6 is generally similar to the method of FIG. 5 but includes two feedback current control circuits 132, 330. Additionally, the method of FIG. 6 also includes a method step related to the current integration not illustrated in FIG. 5. It will be understood, however, that a device implementing the method of FIG. 5, e.g., DC-to-DC converter 100 of FIG. 1 may integrate a control current. For example, FIG. 1 includes capacitor $C_i$, which integrates one of the current outputs of current mirror 138.

At block 602, the amplifier 134 may determine a first voltage difference between the first voltage output and the first reference voltage. Similarly, at block 604 amplifier 334 may determine a second voltage difference between the second voltage output and the second reference voltage. The two voltage differences may be used to generate two control currents.

At block 606, the amplifier 134 may amplify the first voltage difference between the first voltage output and the first reference voltage to output the first control current. Similarly, at step 608, the amplifier 334 amplifies the second voltage difference between the second voltage output and the second reference voltage to output the second control current.

At block 610, the current mirror 138 outputs a first plurality of control currents based on the first control current. At 612 the current mirror 338 outputs a second plurality of control currents based on the second control current. Each of these control currents may be added together such that the sum of the first control current and the second control current comprise a combined control current.

At block 614, the capacitor $C_i$ integrates the combined control current to generate the integrated error signal. The integrated error signal may be used to decide when to stop charging one of the outputs, $V_{neg}$, $V_{neg\_dac}$, of the DC-to-DC converter 300.

In case 4, the $V_{neg}$ output may be tracking class-H. IL ripple may be from ictl+/−idelta. The charge comparator 124 (Ichrg) controls the charge injected to the $V_{neg\_dac}$ output. The comparator 118 (inz), the comparator 120 (ipk), and the comparator 122 (ivly) control the inductor current.

In case 5, both the output Vneg and the output Vneg_dac are charged. IL ripple may be from 0 to IPPFM1+IPPFM2 (~130 mA). The comparator 118 (inz), the comparator 120 (ipk), and the comparator 122 (ivly) control the inductor current.

In some examples, the DC-to-DC converter 100, 200, 300 may include means for generating a first control current based on a voltage difference between a first reference voltage and a first voltage output of the DC-to-DC converter. In some examples, the means for generating the first control current may be the feedback current control circuit 132 of FIGS. 1-3.

In some examples, the DC-to-DC converter 100, 200, 300 may include means for comparing an integrated error signal to a threshold to generate a comparison result, the integrated error signal may include an integration of a first error signal over time. The first error signal may be based on the first control current. In some examples, the means for comparing the integrated error signal to the threshold may include charge comparator 124.

In some examples, the DC-to-DC converter 100, 200, 300 may include means for switching a charging current to the first voltage output of the DC-to-DC converter based on a

TABLE 1

| | | | | Voltage | | Switch state | | | | | |
| | | Current Loop | | loop | | SWP | | SWN1 | | SWN2 | |
| Case# | Vneg | −1.8 V | Ipeak | Ivalley | Vneg | −1.8 V | OFF | ON | OFF | ON | OFF | ON |
| 0 | X | X | X | X | off | off | 1 | 0 | 1 | 0 | 1 | 0 |
| 1 | X | DCM | Ippfm2 | 0 | off | on | ipk | inz | 1 | 0 | inz | ipk |
| 2 | CCM | X | I1 + Irp | I1 − Irn | on | off | ipk | ivly | ivly | ipk | 1 | 0 |
| 3 | DCM | X | Ippfm1 | 0 | on | off | ipk | inz | inz | ipk | 1 | 0 |
| 4 | CCM | DCM | I1 + Irp | I1 − Irn | on | on | ipk | ichrg | ivly | ipk | ichrg | ivly |
| 5 | DCM | DCM | Ippfm1 + ippfm2 | ippfm2 | on | on | ipk | inz | ivly | ipk | inz | ivly |

TABLE 1 illustrates an example switching sequence for various load conditions. The switching sequence may be implemented in control logic 102. As illustrated in TABLE 1, nine possible operation modes may be used in some examples, i.e., nine columns are shown. TABLE 1 illustrates five different cases. Because (in some examples) the load current at $V_{neg\_reg}$ is small, this part of loop may always be in discontinuous conduction mode (DCM) or OFF mode, thus eliminating the need for three operation modes. Depending on the load current at $V_{neg}$, this loop may be DCM, continuous conduction mode (CCM), or OFF mode.

In case 1, the $V_{neg\_dac}$ output may be charged to −25 mV+$V_{ref}$ and IL may ripple from 0 to IPPFM2 (~100 mA). The comparator 118 (inz) and the comparator 120 (ipk) control inductor current.

In case 2, the $V_{neg}$ output may be tracking class-H. IL ripple may be from ictl+/−idelta. Small leakage may occur on $V_{neg\_dac}$ due to n-type metal-oxide semiconductor (NMOS) driver current. The comparator 120 (ipk) and the comparator 122 (ivly) control inductor current.

In case 3, the $V_{neg\_dac}$ output may be charged to −12.5 mV+$V_{ref}$ and IL may ripple from 0 to IPPFM1 (~30 mA). The comparator 120 (ipk) and the comparator 122 (ivly) control inductor current.

comparison between a voltage at the first voltage output and the first reference voltage. The DC-to-DC converter 100, 200, 300 may include means for continuing to apply the charging current to the first output of the DC-to-DC converter based on the comparison between the voltage at the first voltage output and the first reference voltage and a comparison between the voltage at a second voltage output and a second reference voltage. In some examples, the means for switching a charging current to the first voltage output of the DC-to-DC converter based on a comparison between a voltage at the first voltage output and the first reference voltage and the means for continuing to apply the charging current to the first output of the DC-to-DC converter based on the comparison between the voltage at the first voltage output and the first reference voltage and a comparison between the voltage at a second voltage output and a second reference voltage may include one or more of transistor 108 and/or transistor 110. The means for switching a charging current to the first voltage output of the DC-to-DC converter based on a comparison between a voltage at the first voltage output and the first reference voltage and the means for continuing to apply the charging current to the first output of the DC-to-DC converter based on the comparison between the voltage at the first voltage output and the first reference voltage and a comparison between the voltage at a second voltage output and a second reference voltage may also include the nested BBM circuitry 104 and the control logic 102, along with all of the circuitry that provides inputs to the control logic 102.

In some examples, the DC-to-DC converter 100, 200, 300 may include means for switching the charging current to the second voltage output of the DC-to-DC converter. The means for switching the charging current to the second voltage output of the DC-to-DC converter may include one or more of transistor 108 and/or transistor 110. The means for switching the charging current to the second voltage output of the DC-to-DC converter may also include the nested BBM circuitry 104 and the control logic 102, along with all of the circuitry that provides inputs to the control logic 102.

In some examples, the DC-to-DC converter 200, 300 may include means for comparing the voltage at the second voltage output of the DC-to-DC converter and the second reference voltage. The means for comparing the voltage at the second voltage output of the DC-to-DC converter and the second reference voltage may include amplifier 202, amplifier 334, or feedback current control circuit 330.

The DC-to-DC converter 100, 200, 300 may include means for switching the charging current to the second voltage output of the DC-to-DC converter further based on an occurrence of a valley in the voltage at the second voltage output of the DC-to-DC. The means for switching the charging current to the second voltage output of the DC-to-DC converter further based on an occurrence of a valley in the voltage at the second voltage output of the DC-to-DC may include comparator 122 and the circuitry providing inputs to comparator 122. The means for switching the charging current to the second voltage output of the DC-to-DC converter further based on an occurrence of a valley in the voltage at the second voltage output of the DC-to-DC may also include the control logic 102, nested BBM circuitry 104, and transistors 108, 110.

In some examples, the DC-to-DC converter 100, 200, 300 may include means for continuing to apply the charging current to the second voltage output of the DC-to-DC converter based on the comparison result of the integrated error signal. The means for continuing to apply the charging current to the second voltage output of the DC-to-DC converter based on the comparison result of the integrated error signal may include transistor 108 and transistor 110. The means for continuing to apply the charging current to the second voltage output of the DC-to-DC converter based on the comparison result of the integrated error signal may also include the nested BBM circuitry 104, the control logic 102, and the charge comparator 124.

In some examples, the DC-to-DC converter 300 may include means for generating a second control current based on a voltage difference between the second reference voltage and the second voltage output. In some examples, the integrated error signal includes an integration of a sum of the first error signal and a second error signal. The second error signal may be based on the second control current. The means for generating a second control current based on a voltage difference between the second reference voltage and the second voltage output may include the feedback current control circuit 330.

In some examples, the DC-to-DC converter 100, 200, 300 may include means for determining a first voltage difference between the first voltage output and the first reference voltage. The means for determining a first voltage difference between the first voltage output and the first reference voltage may include amplifier 134, amplifier 202, or amplifier 334.

In some examples, the DC-to-DC converter 100, 200, 300 may include means for amplifying the first voltage difference between the first voltage output and the first reference voltage to output the first control current. The means for amplifying the first voltage difference between the first voltage output and the first reference voltage to output the first control current may include amplifier 134, amplifier 202, or amplifier 334.

In some examples, the DC-to-DC converter 100, 200, 300 may include means for outputting a first plurality of control currents based on the first control current. The means for outputting a first plurality of control currents based on the first control current may include the current mirror 138 or the current mirror 338.

In some examples, the DC-to-DC converter 200, 300 may include means for determining a second voltage difference between the second voltage output and the second reference voltage. The means for determining the second voltage difference between the second voltage output and the second reference voltage may include amplifier 134, amplifier 202 or amplifier 334.

In some examples, the DC-to-DC converter 200, 300 may include means for amplifying the second voltage difference between the second voltage output and the second reference voltage to output the second control current. The means for amplifying the second voltage difference between the second voltage output and the second reference voltage to output the second control current may include amplifier 134, amplifier 202 or amplifier 334.

In some examples, the DC-to-DC converter 100, 200, 300 may include means for outputting a second plurality of control currents based on the second control current. The means for outputting a second plurality of control currents based on the second control current may include the current mirror 138 or the current mirror 338.

In some examples, the DC-to-DC converter 100, 200, 300 may include means for integrating the combined control current to generate the integrated error signal. The means for integrating the combined control current to generate the integrated error signal may include capacitor $C_i$.

In some examples, the DC-to-DC converter 100, 200, 300 may include means for determining the voltage difference between the first voltage output and the first reference voltage. The means for determining the voltage difference between the first voltage output and the first reference voltage may include amplifier 134, amplifier 202, or amplifier 334.

In some examples, the DC-to-DC converter 100, 200, 300 may include means for amplifying the voltage difference between the first voltage output and the first reference voltage to output the first control current. The means for amplifying the voltage difference between the first voltage output and the first reference voltage to output the first control current may include amplifier 134, amplifier 202, or amplifier 334. The means for amplifying the voltage difference between the first voltage output and the first reference voltage to output the first control current may also include current converter 136 or current converter 336. The means for amplifying the voltage difference between the first voltage output and the first reference voltage to output the first control current may include, for example, the combination of amplifier 134 and current converter 136 or the combination of amplifier 334 and current convertor 336.

In some examples, the DC-to-DC converter 100, 200, 300 may include means for outputting a plurality of control currents based on the first control current, wherein at least one of the plurality of control currents is the error signal to be integrated. The means for outputting a plurality of control currents based on the first control current may include current mirror 138 or current mirror 338.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A DC-to-DC converter comprising:
    a first feedback current control circuit coupled to a first voltage output of the DC-to-DC converter, the first feedback current control circuit configured to generate a first control current based on a voltage difference between a first reference voltage and the first voltage output of the DC-to-DC converter;
    a constant charge comparator coupled to the first feedback current control circuit and configured to compare an integrated error signal to a threshold to generate a comparison result, the integrated error signal comprising an integration of a first error signal over time, the first error signal based on the first control current; and
    a controller coupled to the first feedback current control circuit through the constant charge comparator, the controller configured to switch a charging current to the first voltage output of the DC-to-DC converter based on a comparison between a voltage at the first voltage output and the first reference voltage and continuing to apply the charging current to the first output of the DC-to-DC converter based on the comparison between the voltage at the first voltage output and the first reference voltage and a comparison between the voltage at a second voltage output and a second reference voltage.

2. The DC-to-DC converter of claim 1, wherein the controller is further configured to switch the charging current to the second voltage output of the DC-to-DC converter based on the comparison of the voltage at the second voltage output of the DC-to-DC converter and the second reference voltage, switching the charging current to the second voltage output of the DC-to-DC converter further based on an occurrence of a valley in the voltage at the second voltage output of the DC-to-DC converter and further comprising the controller continuing to apply the charging current to the second voltage output of the DC-to-DC converter based on the comparison result of the integrated error signal.

3. The DC-to-DC converter of claim 1, wherein the threshold is based on a difference between the second voltage output and the second reference voltage.

4. The DC-to-DC converter of claim 1, further comprising:
    a second feedback current control circuit coupled to the second voltage output of the DC-to-DC converter configured to generate a second control current based on a voltage difference between the second reference voltage and the second voltage output;
    the constant charge comparator coupled to both the first feedback current control circuit and the second current control circuit, the constant charge comparator configured to compare an integrated error signal to a threshold, the integrated error signal comprising an integration of a sum of the first error signal from the first feedback current control circuit and a second error signal from the second current control circuit, the second error signal based on the second control current; and
    the controller coupled to the second feedback current control circuit through the constant charge comparator, the controller further configured to switch a charging current from the first voltage output of the DC-to-DC converter to the second voltage output of the DC-to-DC converter based on the second feedback current control circuit.

5. The DC-to-DC converter of claim 4, wherein the first feedback current control circuit comprises:
    a first difference amplifier configured to determine a voltage difference between the first voltage output and the first reference voltage;
    a first voltage-to-current converter, the first voltage-to-current converter coupled to the first difference amplifier and configured to output the first control current; and
    a first current mirror coupled to the first voltage-to-current converter and configured to output a first plurality of control currents based on the first control current.

6. The DC-to-DC converter of claim 5, wherein the second feedback current control circuit comprises:
    a second difference amplifier configured to determine a voltage difference between a second voltage output and a second reference voltage;
    a second voltage-to-current converter, the first voltage-to-current converter coupled to the first difference amplifier and configured to output the first control current; and
    a second current mirror coupled to the first voltage-to-current converter and configured to output a second plurality of control currents based on the first control current, at least one of the first plurality of control currents and at least one of the second plurality of control currents coupled together to form a combined control current.

7. The DC-to-DC converter of claim 6, wherein the sum of the first control current and the second control current comprise the combined control current.

8. The DC-to-DC converter of claim 7, further comprising an integrator circuit configured to integrate the combined control current and to generate the integrated error signal.

9. The DC-to-DC converter of claim 1, wherein the first feedback current control circuit comprises:
a first difference amplifier configured to determine and amplify the voltage difference between the first voltage output and the first reference voltage;
a first voltage-to-current converter, the first voltage-to-current converter coupled to the first difference amplifier and configured to output the first control current; and
a first current mirror coupled to the first voltage-to-current converter and configured to output a plurality of control currents based on the first control current, wherein at least one of the plurality of control currents is the first error signal to be integrated.

10. A method for a DC-to-DC converter comprising:
generating a first control current based on a voltage difference between a first reference voltage and a first voltage output of the DC-to-DC converter;
comparing an integrated error signal to a threshold to generate a comparison result, the integrated error signal comprising an integration of a first error signal over time, the first error signal based on the first control current; and
switching a charging current to the first voltage output of the DC-to-DC converter based on a comparison between a voltage at the first voltage output and the first reference voltage and continuing to apply the charging current to the first output of the DC-to-DC converter based on the comparison between the voltage at the first voltage output and the first reference voltage and a comparison between the voltage at a second voltage output and a second reference voltage.

11. The method of claim 10, further comprising switching the charging current to the second voltage output of the DC-to-DC converter based on the comparison of the voltage at the second voltage output of the DC-to-DC converter and the second reference voltage, switching the charging current to the second voltage output of the DC-to-DC converter further based on an occurrence of a valley in the voltage at the second voltage output of the DC-to-DC and further comprising continuing to apply the charging current to the second voltage output of the DC-to-DC converter based on the comparison result of the integrated error signal.

12. The method of claim 10, wherein the threshold is based on a difference between the second voltage output and the second reference voltage.

13. The method of claim 10, further comprising generating a second control current based on a voltage difference between the second reference voltage and the second voltage output, and wherein the integrated error signal comprises an integration of a sum of the first error signal and a second error signal, the second error signal based on the second control current.

14. The method of claim 13, further comprising:
determining a first voltage difference between the first voltage output and the first reference voltage;
amplifying the first voltage difference between the first voltage output and the first reference voltage to output the first control current; and
outputting a first plurality of control currents based on the first control current.

15. The method of claim 14, further comprising:
determining a second voltage difference between the second voltage output and the second reference voltage;
amplifying the second voltage difference between the second voltage output and the second reference voltage to output the second control current; and
outputting a second plurality of control currents based on the second control current.

16. The method of claim 15, wherein the sum of the first control current and the second control current comprise a combined control current.

17. The method of claim 16, further comprising integrating the combined control current to generate the integrated error signal.

18. The method of claim 10, wherein determining the first error signal to be integrated comprises:
determining the voltage difference between the first voltage output and a first reference voltage;
amplifying the voltage difference between the first voltage output and the first reference voltage to output the first control current; and
outputting a plurality of control currents based on the first control current, wherein at least one of the plurality of control currents is the first error signal to be integrated.

19. A DC-to-DC converter comprising:
means for generating a first control current based on a voltage difference between a first reference voltage and a first voltage output of the DC-to-DC converter;
means for comparing an integrated error signal to a threshold to generate a comparison result, the integrated error signal comprising an integration of a first error signal over time, the first error signal based on the first control current; and
means for switching a charging current to the first voltage output of the DC-to-DC converter based on a comparison between a voltage at the first voltage output and the first reference voltage and means for continuing to apply the charging current to the first voltage output of the DC-to-DC converter based on the comparison between the voltage at the first voltage output and the first reference voltage and a comparison between the voltage at a second voltage output and a second reference voltage.

20. The DC-to-DC converter of claim 19, further comprising means for switching the charging current to the second voltage output of the DC-to-DC converter based on a means for comparing the voltage at the second voltage output of the DC-to-DC converter and the second reference voltage, means for switching the charging current to the second voltage output of the DC-to-DC converter further based on an occurrence of a valley in the voltage at the second voltage output of the DC-to-DC and further comprising means for continuing to apply the charging current to the second voltage output of the DC-to-DC converter based on the comparison result of the integrated error signal.

21. The DC-to-DC converter of claim 19, wherein the threshold is based on a difference between the second voltage output and the second reference voltage.

22. The DC-to-DC converter of claim 19, further comprising means for generating a second control current based on a voltage difference between the second reference voltage and the second voltage output, and wherein the integrated error signal comprises an integration of a sum of the first error signal and a second error signal, the second error signal based on the second control current.

23. The DC-to-DC converter of claim 22, further comprising:
    means for determining a first voltage difference between the first voltage output and the first reference voltage;
    means for amplifying the first voltage difference between the first voltage output and the first reference voltage to output the first control current; and
    means for outputting a first plurality of control currents based on the first control current.

24. The DC-to-DC converter of claim 23, further comprising:
    means for determining a second voltage difference between the second voltage output and the second reference voltage;
    means for amplifying the second voltage difference between the second voltage output and the second reference voltage to output the second control current; and
    means for outputting a second plurality of control currents based on the second control current.

25. The DC-to-DC converter of claim 24, wherein the sum of the first control current and the second control current comprise a combined control current.

26. The DC-to-DC converter of claim 25, further comprising means for integrating the combined control current to generate the integrated error signal.

27. The DC-to-DC converter of claim 19, wherein determining the error signal to be integrated comprises:
    means for determining the voltage difference between the first voltage output and the first reference voltage;
    means for amplifying the voltage difference between the first voltage output and the first reference voltage to output the first control current; and
    means for outputting a plurality of control currents based on the first control current, wherein at least one of the plurality of control currents is the first error signal to be integrated.

* * * * *